US006822659B2

(12) United States Patent
Marion et al.

(10) Patent No.: US 6,822,659 B2
(45) Date of Patent: Nov. 23, 2004

(54) METHOD AND APPARATUS FOR INCREASING PIXEL INTERPRETATIONS BY IMPLEMENTING A TRANSPARENT OVERLAY WITHOUT REQUIRING WINDOW IDENTIFIER SUPPORT

(75) Inventors: Neal Richard Marion, Georgetown, TX (US); George F. Ramsay, III, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 10/150,002

(22) Filed: May 16, 2002

(65) Prior Publication Data

US 2003/0214516 A1 Nov. 20, 2003

(51) Int. Cl.[7] .................................................. G06F 3/00

(52) U.S. Cl. ....................... 345/629; 345/630; 345/632; 345/781

(58) Field of Search ................................ 345/629, 630, 345/632, 601, 602, 589, 759, 781, 783, 799, 803, 806, 807

(56) References Cited

U.S. PATENT DOCUMENTS 5,396,263 A * 3/1995 Seiler et al. ................ 345/803
5,430,465 A * 7/1995 Sabella et al. .............. 345/601
5,440,680 A * 8/1995 Ichikawa et al. ........... 345/807
5,475,812 A * 12/1995 Corona et al. .............. 345/807
5,629,720 A * 5/1997 Cherry et al. ............... 345/601
5,854,628 A * 12/1998 Nakagawa .................. 345/803
5,874,967 A * 2/1999 West et al. ................. 345/629
6,567,091 B2 * 5/2003 Dye et al. ................... 345/501
6,573,904 B1 * 6/2003 Chun et al. ................. 345/629
6,603,482 B1 * 8/2003 Tidwell ...................... 345/592

* cited by examiner

*Primary Examiner*—Matthew Luu
*Assistant Examiner*—Daniel J Chung
(74) *Attorney, Agent, or Firm*—Duke W. Yee; Mark E. McBurney

(57) ABSTRACT

A method, apparatus, and computer instructions for displaying data. Each entry in a plurality of entries for an overlay window attribute table (WAT) is set with identical information in which a window identifier is unnecessary for accessing the information in the overlay WAT. Information in a color WAT is retrieved using the set of window identifiers in response to receiving a set of window identifiers. The information in the overlay WAT is retrieved without requiring the window identifier. Pixels are displayed on a display screen using the information retrieved from the color WAT and the information retrieved from the overlay WAT.

33 Claims, 4 Drawing Sheets

500

| WID (502) | PIXEL TYPE (504) | COLOR COLORMAP (506) | OVERLAY COLORMAP (508) | TRANSPARENT (510) | OVERLAY (512) |
|---|---|---|---|---|---|
| 0 | 8 | 4 | 1 | YES | YES |
| 1 | 24 | 1 | 1 | YES | YES |
| 2 | 24 | 3 | 1 | YES | YES |
| 3 | 8 | 0 | 1 | YES | YES |

400

| WID (402) | PIXEL TYPE (404) | COLORMAP (406) | BUFFER (408) | GAMMA (410) |
|---|---|---|---|---|
| 0 | 8 | 4 | 0 | 0 |
| 1 | 24 | 1 | 0 | 0 |
| 2 | 24 | 3 | 0 | 0 |
| 3 | 8 | 0 | 0 | 0 |

412

| WID (414) | COLORMAP (416) | TRANSPARENT (418) | OVERLAY (420) |
|---|---|---|---|
| 0 | 1 | YES | YES |
| 1 | 1 | YES | YES |
| 2 | 1 | YES | YES |
| 3 | 1 | YES | YES |

*FIG. 4B*

500

| WID (502) | PIXEL TYPE (504) | COLOR COLORMAP (506) | OVERLAY COLORMAP (508) | TRANSPARENT (510) | OVERLAY (512) |
|---|---|---|---|---|---|
| 0 | 8 | 4 | 1 | YES | YES |
| 1 | 24 | 1 | 1 | YES | YES |
| 2 | 24 | 3 | 1 | YES | YES |
| 3 | 8 | 0 | 1 | YES | YES |

*FIG. 5*

METHOD AND APPARATUS FOR INCREASING PIXEL INTERPRETATIONS BY IMPLEMENTING A TRANSPARENT OVERLAY WITHOUT REQUIRING WINDOW IDENTIFIER SUPPORT

BACKGROUND OF THE INVENTION

1. Technical Field

The present invention relates generally to an improved data processing system, and in particular, to a method and apparatus for processing graphics data. Still more particularly, the present invention provides a method and apparatus for displaying pixels without requiring window identifier support for overlay pixels.

2. Description of Related Art

Computer graphics concerns the synthesis or display of real or imaginary objects from computer-based models. In computer graphics systems, images are displayed on a display device to a user in two-dimensional and three-dimensional forms. These images are displayed using pixels. A pixel is short for a picture element. One spot in a rectilinear grid of thousands of such spots that are individually "painted" to form an image produced on the screen by a computer or on paper by a printer. A pixel is the smallest element that display or print hardware and software can manipulate in creating letters, numbers, or graphics. These pixels and information relating to these pixels are stored in a buffer. The information describing a pixel is identified using a window ID (WID). A WID is used as an index into a window attribute table (WAT). The WAT contains information describing how a pixel will be displayed on the screen. For example, a WAT identifies depth, colormap, buffer, and gamma for a pixel.

Typically, the WID is drawn into a separate buffer, which is used to describe how the pixels in the frame buffer or buffers will be displayed. Some graphics systems, such as, for example, UNIX servers, use overlays to enhance the performance of three-dimensional applications, which need to be overlaid on top of a three-dimensional application. An example of such is a menu. These types of servers typically require a separate WID buffer for the color planes and overlays so that multiple pixel interpretations can be supported on a per-pixel basis, which is required for transparent overlay support. A pixel interpretation is the way in which a pixel is displayed. Pixel interpretation involves displaying a pixel based on information or attributes associated or designated for the pixel, such as whether the pixel is 8 bits or 24 bits in depth. This pixel interpretation also includes other attributes, such as, for example, the colormap and the gamma map. Production of graphic cards that provide this support is expensive.

Therefore, it would be advantageous to have an improved method, apparatus, and computer instructions for providing overlay support without requiring dedicated WID hardware.

SUMMARY OF THE INVENTION

The present invention provides a method, apparatus, and computer instructions for displaying data. Each entry in a plurality of entries for an overlay window attribute table (WAT) is set with identical information in which a window identifier is unnecessary for accessing the information in the overlay WAT. Information in a color WAT is retrieved using the set of window identifiers in response to receiving a set of window identifiers. The information in the overlay WAT is retrieved without requiring the window identifier. Pixels are displayed on a display screen using the information retrieved from the color WAT and the information retrieved from the overlay WAT.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a graphics adapter in accordance with a preferred embodiment of the present invention;

FIGS. 4A and 4B are diagrams of window attribute tables in accordance with a preferred embodiment of the present invention;

FIG. 5 is a diagram illustrating a window attribute table in accordance with a preferred embodiment of the present invention.

DETAILED DESCRIPTION OF THE PREFERRED EMBODIMENT

Figure 1:
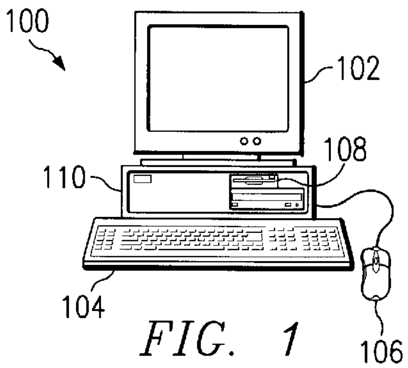
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
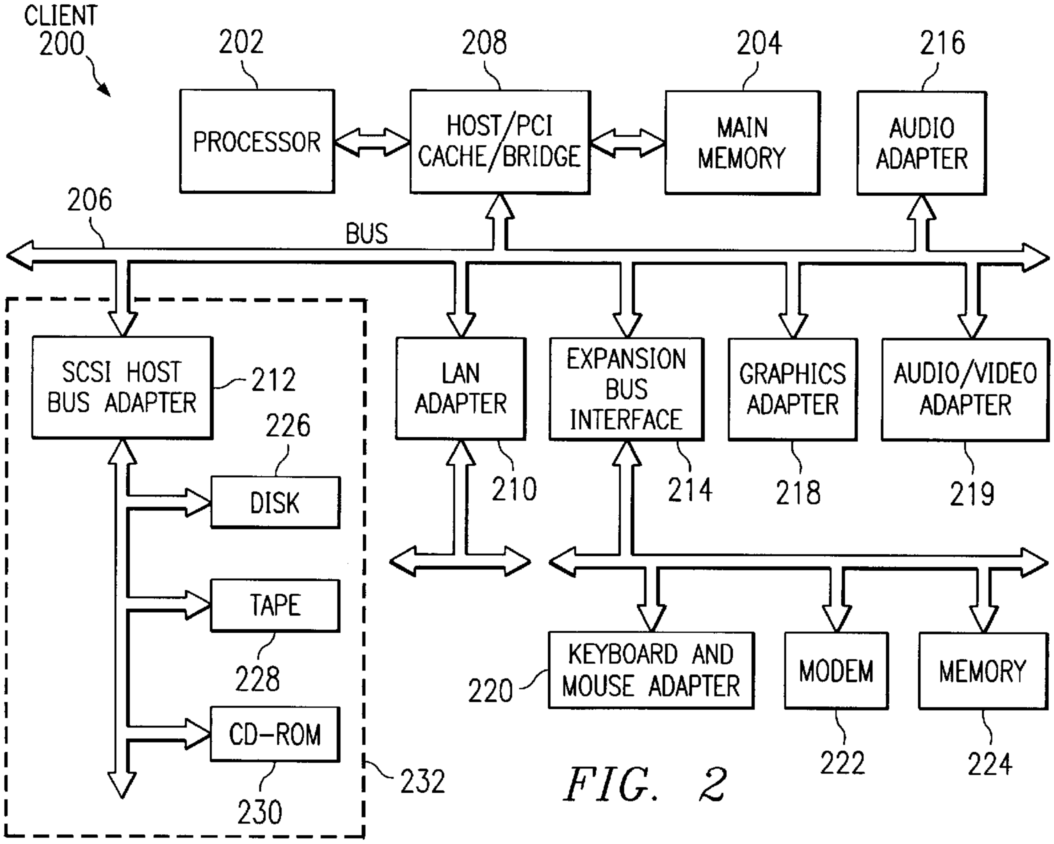
FIG. 2 is a block diagram illustrating a data processing system in which the present invention may be implemented.

With reference now to FIG. 2, a block diagram illustrating a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. The processes of the present invention may be used to manage rendering of data by graphics adapter 218 or audio/video adapter 219.

Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide nonvolatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figures 3, 4A:
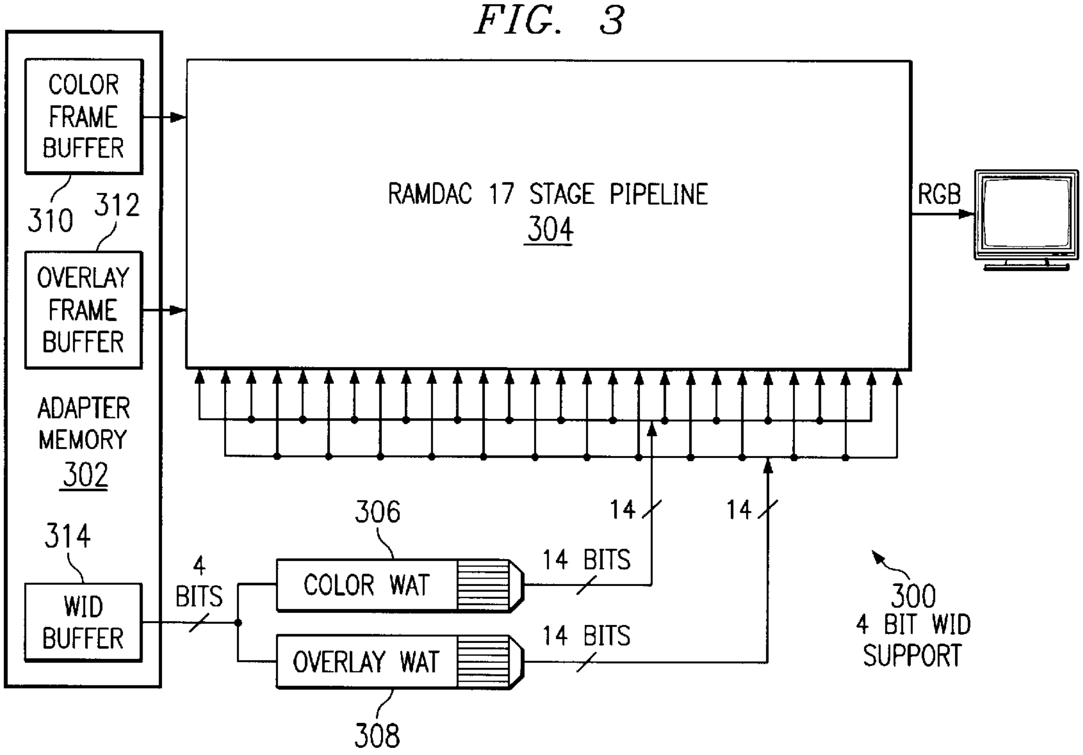

Turning next to FIG. 3, a block diagram illustrating a graphics adapter is depicted in accordance with a preferred embodiment of the present invention. Graphics adapter 300 is an example of a graphics adapter, such as graphics adapter 218 in FIG. 2. Graphics adapter 300 includes an adapter memory 302, a random access memory digital to analog converter (RAMDAC) 304, a color WAT table 306, and an overlay WAT table 308. Adapter memory 302 includes a color frame buffer 310, an overlay frame buffer 312, and a WID buffer 314. The two frame buffers contain pixels, which are sent to RAMDAC 304 for output to a display device. RAMDAC 304 is a graphics controller chip that maintains the color palette and converts data from memory into analog signals for a display device.

WID buffer 314 contains WIDs that are used as an index into color WAT table 306 and overlay WAT table 308. Each of these WAT tables describes how a pixel will be shown on a display device.

The present invention provides a method, apparatus, and computer instructions for reducing the WIDs needed to display pixels in different frame buffers. Specifically, with currently available systems, one window attribute table is assigned for color frame buffer 310 and a second window attribute table is assigned to overlay frame buffer 312. Previously, at least one WID would be required for use in displaying overlay information. As a result, in most graphics adapters, N number of WIDs are assigned to the overlay frame buffer and N number of WIDs are assigned to the color frame buffer. Currently, a WID also is required to turn off pixels in overlay frame buffer 312 to allow for pixels in color frame buffer 310 to be displayed. Such a mechanism also reduces the number of WIDs available by 1. As a result, if a single WID is assigned for pixel interpretations in overlay frame buffer 312, then N −1 WIDs are currently available for different pixel interpretations. A pixel interpretation involves, for example, a different color depth or colormap.

The present invention provides an improved method, apparatus, and computer instructions for handling window attribute information in a manner that does not require a WID to be associated with overlay information. For example, the information in overlay WAT 308 may be set such that all of the information is identical for each entry. Thus, the particular WID used does not matter with respect to the information obtained from overlay WAT 308. Thus, all of the WIDS may be assigned for use in color interpretations for color WAT 306. Different WIDs used for color WAT 306 result in different pixel interpretation information being obtained from color WAT 306, but always the same information from overlay WAT 308.

In another embodiment of the present invention, the mechanism of the present invention employs a single table in which all entries for overlay and transparency fields are enabled and share the same overlay colormap. By combining information in the entries and not requiring a second WAT table, the number of pixel interpretations with the same number of WIDs are increased. In this manner, no need is present for a WID to be designated for the overlay. All of the WIDs may be used in the color planes to display different pixel interpretations.

Further, the particular WIDs written into WID buffer 314 do not matter when displaying pixels in overlay frame buffer 312. The transparent field is set in the WAT entry, causing the WID to display the color frame buffer if the particular transparent pixel value is present. For example, this pixel value may be "FF". Therefore, if this pixel value is present in overlay frame buffer 312, the WID will cause the color frame buffer pixel in color frame buffer 310 to be displayed. As a result, a WID for turning off the overlay frame buffer is unnecessary. In this manner, N+1 number of pixel interpretations may be provided when N number of WIDs are present.

With reference now to FIGS. 4A and 4B, diagrams of window attribute tables are depicted in accordance with a preferred embodiment of the present invention. Color window attribute (WAT) 400, in FIG. 4A, contains information used for pixel interpretations in a color frame buffer, such as color frame buffer 310 in FIG. 3. Color WAT 400 includes WID field 402, pixel type field 404, colormap field 406, buffer field 408, and gamma field 410. WID field 402 is used as an index into entries into color WAT 400. Pixel type field 404 is used to identify the type of pixel, such as 8 bits or 24 bits. Colormap field 406 indicates the particular colormap that is to be used to display the pixel. Buffer field 408 is used in the instance in which a double buffer is present and identifies whether the front or back buffer is to be used. Gamma field 410 is used to identify a gamma map for the pixel.

In FIG. 4B, overlay WAT 412 includes WID field 414, colormap field 416, transparent field 418, and overlay field 420. WID field 414 is used as an index into the entries in overlay WAT 412. Colormap field 416 identifies the particular colormap used for the pixel. Transparent field 418 is used to indicate that the overlay frame buffer may be transparent, allowing a pixel in a color frame buffer to be displayed in place of a corresponding pixel in the overlay frame buffer. A corresponding pixel is a pixel that would be displayed in the same location as a pixel in another frame buffer. Overlay field 420 indicates that the pixel is an overlay pixel type. If this field is set to no, the corresponding pixel in the color buffer is displayed. In these examples, all of the information for colormap field 416, transparent field 418, and overlay field 420 are the same for each WID. As a result, all of the WIDS may be assigned for use in different interpretations in color WAT 400. The same WIDs are used in overlay WAT 412, rather than different WIDS as currently used. No WID is required to be associated with the overlay information because the same information is returned for any WID that is used as an index into overlay WAT 412. As a result, all of the WIDs are available for interpretations in the color frame buffer.

With reference now to FIG. 5, a diagram illustrating a window attribute table is depicted in accordance with a preferred embodiment of the present invention. In this example, table 500 includes WID field 502, pixel type field 504, color colormap field 506, overlay colormap field 508, transparent field 510, and overlay field 512 in each of the entries. WID field 502 is used as an index into table 500. Pixel type field 504 contains information used to identify the particular pixel type, such as 8 bits or 24 bits. Color colormap field 506 includes information used to identify the colormap to be used in a color frame buffer, such as color frame buffer 310 in FIG. 3. Overlay colormap field 508 is used to identify the colormap that is to be used in an overlay frame buffer, such as overlay frame buffer 312 in FIG. 3. Transparent field 510 is used to indicate that the overlay frame buffer may be transparent allowing a pixel in the color frame buffer to be displayed in place of the corresponding pixel in the overlay frame buffer. The mechanism of the present invention allows for this transparency when the feature is enabled in this field by the presence of a selected value in the overlay framebuffer. Any value may be used, but in these examples, the value is "FF". Overlay field 512 indicates that the pixel is an overlay pixel type.

Overlay colormap field 508, transparent field 510, and overlay field 512 are fields normally found in a separate overlay window attribute table, but are placed into this combined color and overlay window attribute table in a manner in which the particular WID used does not matter because all of the information for each of these fields is identical throughout the table.

In this example, a buffer and gamma field are not included in table 500. Depending on the particular implementation, these fields may be included if the hardware supports adding additional fields for the tables. With a combined table, an overlay WAT, such as overlay WAT 308 in FIG. 3, is unnecessary. In fact, the hardware may now be used to support additional types of pixel interpretations for the color frame buffer.

Figure 6:
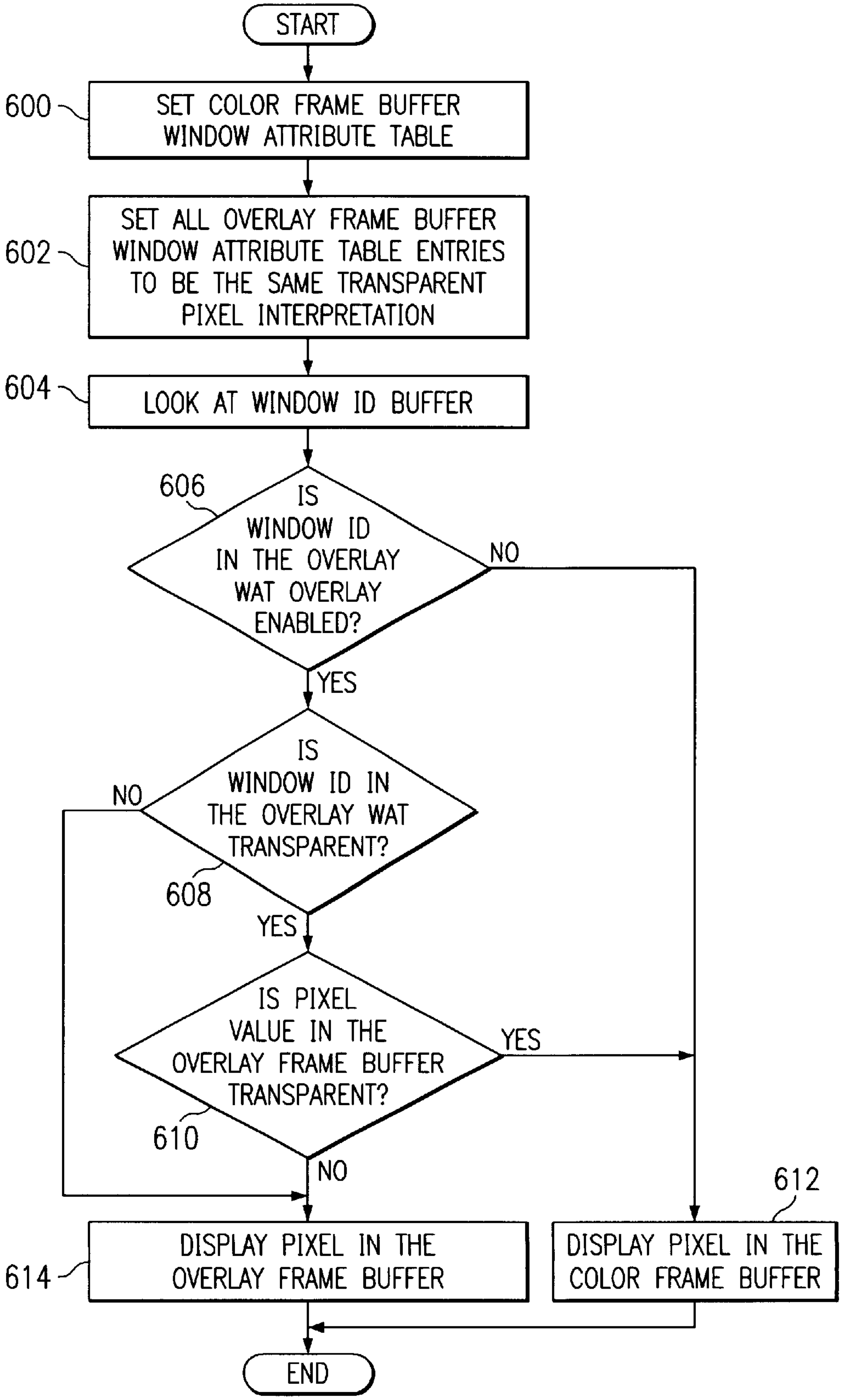
FIG. 6 is a flowchart of a process used for displaying pixels in accordance with a preferred embodiment of the present invention.

With reference now to FIG. 6, a flowchart of a process used for displaying pixels is depicted in accordance with a preferred embodiment of the present invention. The process illustrated in FIG. 6 may be implemented in a processing unit, such as one in RAMDAC 304 in FIG. 3. This process uses WATS, such as color WAT 306 and overlay WAT 308 with tables, such as color WAT 400 and overlay WAT 412 illustrated in FIGS. 4A and 4B.

The process begins by setting the color frame buffer window attribute table (step 600). All overlay frame buffer window attribute table entries are set to be the same transparent pixel interpretation (step 602). These entries are set such that the information is identical for each entry, such as illustrated for overlay WAT 412 in FIG. 4B. The window ID buffer is examined (step 604). This window ID buffer is one such as WID buffer 314 in FIG. 3. This information is used as an index into the WATs.

Next, a determination is made as to whether the window ID in the overlay WAT is overlay enabled (step 606). If the window ID in the overlay is WAT overlay enabled, a determination is made as to whether the window ID in the overlay WAT is transparent (step 608). If the window ID in the overlay WAT is transparent, a determination is made as to whether the pixel value in the overlay frame buffer indicates that the pixel is transparent (step 610). For example, this value may be "0xFF". This particular value is selected as one that indicates that the pixel in the overlay frame buffer is transparent such that the pixel in the color frame buffer corresponding to the pixel in the overlay frame buffer is displayed. Such a feature does not require the use of a WID to turn off the pixel in the overlay frame buffer. If the pixel value in the overlay frame buffer is transparent, the pixel is displayed in the color frame buffer (step 612) and the process terminates thereafter.

With reference again to step 610, if the pixel value in the overlay frame buffer is not transparent, the pixel is displayed in the overlay frame buffer (step 614) and the process terminates thereafter. Referring again to step 608, if the window ID in the overlay WAT is not transparent, the process proceeds to step 614 as described above. Returning again to step 606, if the window ID in the overlay WAT is not overlay enabled, the process proceeds to step 612 as described above.

Thus, the present invention provides an improved method, apparatus, and computer instructions for displaying pixels in a data processing system in such a manner that a separate overlay WID is not required. This advantage is achieved by using the same interpretation for overlay pixels in all of the entries as described above. As a result, WIDs that would be used for overlay support may now be used for displaying pixels in the color frame buffer.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for displaying data, the method comprising:

setting each entry in a plurality of entries for an overlay window attribute table with identical information, wherein a window identifier is unnecessary for accessing information in the overlay window attribute table;

responsive to receiving a set of window identifiers, retrieving information in a color window attribute table using the set of window identifiers;

retrieving the information in the overlay window attribute table without requiring the window identifier; and displaying pixels on a display screen using the information retrieved from the color window attribute table and the information retrieved from the overlay window attribute table.

2. The method of claim 1, wherein the each entry in the overlay window attribute table includes an identical transparency setting.

3. The method of claim 1, wherein the each entry in the overlay window attribute table includes an identical colormap.

4. The method of claim 2, wherein the displaying step comprises:

selectively sending pixels from a color frame buffer and an overlay frame buffer for display on a display device.

5. The method of claim 4, wherein the displaying step further comprises:

sending a pixel from the color frame buffer for display on the display device instead of the overlay frame buffer if a corresponding pixel location in the overlay frame buffer includes the identical transparency setting.

6. A method in a data processing system for displaying data, the method comprising:

identifying display information for pixels from a first window attribute table and a second window attribute table, wherein the second window attribute table has identical display information for selected information in the second window attribute table such that a window identifier for the second window attribute table is unnecessary to obtain display information from the first window attribute table; and displaying a pixel in a first frame buffer in response to a transparency value being set for a corresponding pixel in a second frame buffer.

7. The method of claim 6, wherein the second window attribute table is an overlay window attribute table.

8. The method of claim 6, wherein the first window attribute table is a color attribute table.

9. The method of claim 6, wherein the selected information is a colormap.

10. The method of claim 6, wherein the selected information is the transparency value.

11. The method of claim 6, wherein the first frame buffer is a color frame buffer and the second frame buffer is an overlay frame buffer.

12. The method of claim 6, wherein the display information for pixels from the first window attribute table is identified using the window identifier.

13. A method in a data processing system for displaying pixels, the method comprising:

setting first display information for a single pixel interpretation to display pixels in an overlay frame buffer, wherein a window identifier is unnecessary for accessing information in the overlay window attribute table;

responsive to receiving a window identifier, retrieving second display information in a color window attribute table using the set of window identifiers;

retrieving the first display information without requiring the window identifier; and displaying pixels on a display screen using the second display information retrieved from the color window attribute table and the first information.

14. The method of claim 13, wherein the first display information is located in an overlay window attribute table.

15. The method of claim 13, wherein the first display information is located in the color window attribute table.

16. The method of claim 13, wherein the information includes at least one of a colormap and enabling transparency.

17. The method of claim 16, wherein the displaying step includes:

sending a pixel in a color frame buffer instead of a corresponding pixel in the overlay frame buffer if a selected value is present for the corresponding pixel in the overlay frame buffer.

18. A display apparatus comprising:

a first frame buffer for storing a first set of pixels;

a second frame buffer for storing a second set of pixels;

a color window attribute table storing display information;

an overlay window attribute table storing display information, wherein all entries in the overlay window attribute table are identical;

a window identifier buffer connected to the color window attribute table and the overlay window attribute table, wherein the window identifier buffer stores window identifiers used to identify display information for the first set of pixels and for the second set of pixels;

a random access memory digital to analog converter unit connected to the first frame buffer, the second frame buffer, the color window attribute table, and the overlay window attribute table and having a connection configured for the connection to a display device, wherein the random access memory digital to analog converter unit receives pixels for display from the first frame buffer and the second frame buffer and displays the pixels using display information from the color window attribute table and the overlay window attribute table; and a processing unit, wherein the processing unit identifies display information for pixels from a first window attribute table and a second window attribute table in which the second window attribute table has identical display information for selected information in the second window attribute table such that a window identifier for the second window attribute table is unnecessary to obtain display information from the first window attribute table and displays a pixel in the first frame buffer in response to a transparency value being set for a corresponding pixel in the second frame buffer.

19. The display apparatus of claim 18, wherein the processing unit is located in the random access memory digital to analog converter unit.

20. A data processing system for displaying data, the data processing system comprising:

setting means for setting each entry in a plurality of entries for an overlay window attribute table with identical information, wherein a window identifier is unnecessary for accessing information in the overlay window attribute table;

first retrieving means, responsive to receiving a set of window identifiers, for retrieving information in a color window attribute table using the set of window identifiers;

second retrieving means for retrieving the information in the overlay window attribute table without requiring the window identifier; and displaying means for displaying pixels on a display screen using the information retrieved from the color window attribute table and the information retrieved from the overlay window attribute table.

21. The data processing system of claim 20, wherein the each entry in the overlay window attribute table includes an identical transparency setting.

22. The data processing system of claim 20, wherein the each entry in the overlay window attribute table includes an identical colormap.

23. The data processing system of claim 21, wherein the displaying means further comprises:

sending means for selectively sending pixels from a color frame buffer and an overlay frame buffer for display on a display device.

24. The data processing system of claim 23, wherein the first displaying means further comprises:

second sending means for sending a pixel from the color frame buffer for display on the display device instead of the overlay frame buffer if a corresponding pixel location in the overlay frame buffer includes the identical transparency setting.

25. A data processing system for displaying data, the data processing system comprising:

identifying means for identifying display information for pixels from a first window attribute table and a second window attribute table, wherein the second window attribute table has identical display information for selected information in the second window attribute table such that a window identifier for the second window attribute table is unnecessary to obtain display information from the first window attribute table; and displaying means for displaying a pixel in a first frame buffer in response to a transparency value being set for a corresponding pixel in a second frame buffer.

26. The data processing system of claim 25, wherein the second window attribute table is an overlay window attribute table.

27. The data processing system of claim 25, wherein the first window attribute table is a color attribute table.

28. The data processing system of claim 25, wherein the selected information is a colormap.

29. The data processing system of claim 25, wherein the selected information is the transparency value.

30. The data processing system of claim 25, wherein the first frame buffer is a color frame buffer and the second frame buffer is an overlay frame buffer.

31. The data processing system of claim 25, wherein the display information for pixels from the first window attribute table is identified using the window identifier.

32. A computer program product in a computer readable medium for displaying data, the computer program product comprising:

first instructions for setting each entry in a plurality of entries for an overlay window attribute table with identical information, wherein a window identifier is unnecessary for accessing information in the overlay window attribute table;

second instructions, responsive to receiving a set of window identifiers, for retrieving information in a color window attribute table using the set of window identifiers;

third instructions for retrieving the information in the overlay window attribute table without requiring the window identifier; and fourth instructions for displaying pixels on a display screen using the information retrieved from the color window attribute table and the information retrieved from the overlay window attribute table.

33. A computer program product in a computer readable medium for displaying data, the computer program product comprising:

first instructions for identifying display information for pixels from a first window attribute table and a second window attribute table, wherein the second window attribute table has identical display information for selected information in the second window attribute table such that a window identifier for the second window attribute table is unnecessary to obtain display information from the first window attribute table; and second instructions for displaying a pixel in a first frame buffer in response to a transparency value being set for a corresponding pixel in a second frame buffer.

* * * * *